US006652968B1

(12) United States Patent
Miller et al.

(10) Patent No.: US 6,652,968 B1
(45) Date of Patent: Nov. 25, 2003

(54) PRESSURE ACTIVATED ELECTRICALLY CONDUCTIVE MATERIAL

(76) Inventors: Dorothy H. J. Miller, 5737 Aloha Ave., Knoxville, TN (US) 37921; Brian L. Miller, 5737 Aloha Ave., Knoxville, TN (US) 37921

( * ) Notice: Subject to any disclaimer, the term of this patent is extended or adjusted under 35 U.S.C. 154(b) by 47 days.

(21) Appl. No.: 09/814,631

(22) Filed: Mar. 22, 2001

(51) Int. Cl.[7] .............................. B05D 5/12; C08J 9/32; C08K 3/08; C08K 3/34; H01H 1/02

(52) U.S. Cl. ....................... 428/407; 428/570; 427/100; 427/126.1; 427/217; 523/205; 523/218; 523/219; 524/439; 524/440; 200/265; 200/511

(58) Field of Search ................................ 523/219, 218, 523/205; 524/439, 440; 427/100, 126.1, 217; 428/407, 570; 200/265, 511

(56) References Cited

U.S. PATENT DOCUMENTS

| | | | | |
|---|---|---|---|---|
| 2,761,849 | A | | 9/1956 | Coler |
| 3,654,187 | A | | 4/1972 | Takenaka et al. |
| 3,875,434 | A | | 4/1975 | Harden et al. |
| 4,028,276 | A | | 6/1977 | Harden et al. |
| 4,533,604 | A | | 8/1985 | Honda et al. |
| 4,545,926 | A | | 10/1985 | Fouts, Jr. et al. |
| 4,624,798 | A | * | 11/1986 | Gindrup et al. |
| 4,624,865 | A | * | 11/1986 | Gindrup et al. |
| 4,898,689 | A | | 2/1990 | Hamada et al. |
| 5,004,562 | A | | 4/1991 | Kissel |
| 5,084,211 | A | | 1/1992 | Kawaguchi et al. |
| 5,140,371 | A | | 8/1992 | Ishihara et al. |
| 5,378,533 | A | | 1/1995 | Ota |
| 5,451,629 | A | | 9/1995 | Jacobs |
| 5,549,849 | A | | 8/1996 | Namura et al. |
| 5,876,632 | A | | 3/1999 | Miyakawa et al. |
| 5,955,164 | A | | 9/1999 | Miyakawa et al. |
| 6,020,055 | A | * | 2/2000 | Pearce |
| 6,031,039 | A | | 2/2000 | Koppen |
| 6,043,308 | A | | 3/2000 | Tanahashi et al. |

* cited by examiner

*Primary Examiner*—Tae H. Yoon
(74) *Attorney, Agent, or Firm*—Pitts & Brittian, P.C.

(57) ABSTRACT

A pressure activated electrically conductive polymeric matrix material that is doped with particulate filler material. Electrical conductivity is pressure activated with a change in electrical resistance; specifically, with no pressure applied, the material is at a high resistance and with pressure the resistance is materially lower. Conductive fillers may be spherical or powder substrate, such as glass, graphite, etc., having plated thereon a metal coating which is electrically conductive and which is more thermally conductive than the substrate. The polymeric matrix materials may include polyurethane, silicone, and many other synthetic or natural rubbers. The material of the present invention exhibits a unique on-off switching characteristic, in that, at a pressure smaller than actuation pressure, the amount of current the material can switch is zero; at pressure greater or equal to actuation pressure, the material switches the full current, with no material change in the overall temperature of the material. This translates into a very sharp decrease in the electrical resistance of the material with little or no detectable increase in the overall temperature of the material. The material also exhibits a latching function, in that, when the material is under pressure, current drops immediately to zero or a few milliamperes when the continuous current flowing through the material exceeds its maximum continuous current flow value with no material change in the overall temperature of the material. The differences in electrical and thermal conductivity of the metal coating and the substrate and the small contact areas between conductive spheres or powder particles are believed to be the physical bases of the on-off switching and latching characteristics.

27 Claims, 7 Drawing Sheets

Test conditions: 6V(DC or AC), 350 ohm linear load.

Sample material thickness: 1mm

Test conditions: 6V (DC or AC), 350ohm linear load.

Sample material thickness: 1mm

Test conditions: various linear resistive loads
Sample S7 thickness: 1mm

Test Condition: various linear resistive loads
Material thickness: ≤2.5mm

Test conditions: 12V DC/AC, various linear loads.

Sample material thickness: 1mm

PRESSURE ACTIVATED ELECTRICALLY CONDUCTIVE MATERIAL

BACKGROUND OF THE INVENTION

1. Field of Invention

This invention relates to pressure-activated material whose electrical characteristics are modified in response to a pressure applied to the material.

2. Description of the Related Art

Pressure-activated electrically conductive materials of the prior art include various electrically conductive fillers embedded within an elastomeric polymeric matrix. Such materials, however, are known only to provide for decreasing electrical resistance of the material as a function of increased pressure applied thereto. Many of these devices are designed for either a single use, for operations having a relatively short duration, and/or low current operation.

BRIEF SUMMARY OF THE INVENTION

In accordance with one aspect of the present invention, there is provided a pressure activated electrically conductive polymeric matrix material that is doped with particulate filler material. Electrical conductivity is pressure activated with a change in electrical resistance: specifically, with no pressure applied, the material is at a high resistance and with pressure the resistance is materially lower. Conductive fillers may be spherical or powder substrate such as glass, graphite, etc., having plated thereon a metal coating which is electrically conductive and which is more thermally conductive than the substrate. The conductive filler also may comprise a solid metal substrate where the metal of the substrate is less thermally conductive than the metal coating thereon, a gas-filled hollow metal sphere, or a hollow glass or like sphere which is coated with an outer layer of metal. The polymeric matrix materials may include elastic polyurethane, silicone, and many other synthetic or natural rubbers.

As desired for a given application, the material of the present invention exhibits a unique on-off switching characteristic, in that, at a pressure smaller than actuation pressure, the amount of current the material can switch is zero; at pressure greater or equal to actuation pressure, the material switches the full current. This translates into a very sharp decrease in the electrical resistance of the material with little or no detectable increase in the overall temperature of the material.

In another application, the material exhibits a latching function, in that, when the material is under pressure, current drops immediately to zero or a few milliamperes when the continuous current flowing through the material exceeds its maximum continuous current flow value with no noticeable change in the overall temperature of the material. The differences in electrical and thermal conductivity of the metal coating and the substrate and the small contact areas between conductive spheres or powder particles are believed to be the physical bases of the on-off switching and latching characteristics.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The pressure activated electrically conductive material 10 of the present invention includes an electrically non-conductive polymer matrix material that is doped with an electrically conductive filler.

Figure 1:
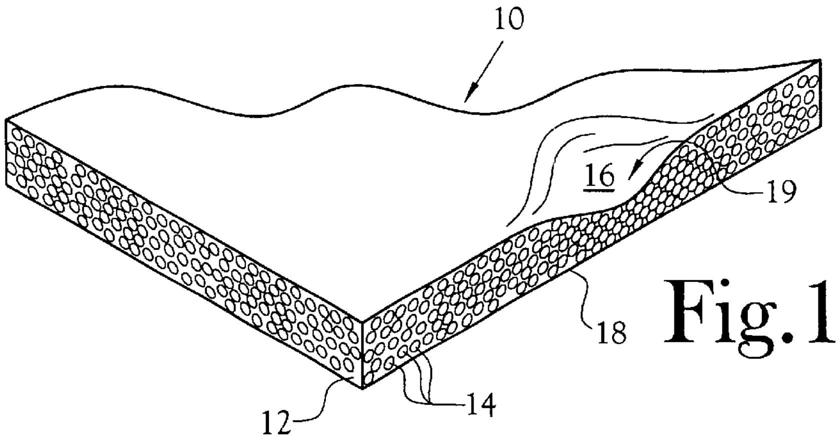
FIG. 1 is a schematic representation, part in section, depicting one embodiment of a pressure-activated, electrically conductive material embodying various features of the present invention.

FIG. 1 depicts a simple embodiment of the present invention comprising a sheet of pressure-activated electrically conductive material 10 formed from a polymeric matrix 12 within which there are embedded multiple metal-coated spheres 14 (the filler). The depicted sheet is essentially non-electrically conductive when the polymeric matrix is in its relaxed state. However, upon the application of pressure to the sheet, for example a pressure which compresses the thickness of the sheet between its opposite sides 16 and 18 such that the embedded spheres or powder particles are forced into contact with one another within the compressed area, the sheet becomes electrically conductive along a path defined by the contacting spheres. It is noted that suitable filler or fillers for the material of the present invention comprise three-dimensional metal-coated spheres or particles which are amenable to the development of point-to-point contact with one another, as opposed to contact between flat surfaces, the area of the individual inter-sphere or inter-particle contacts being minimized in the present material. This feature of the present invention is useful in ready establishment of an electrically conductive path employing minimum compression of the matrix material and ready breaking of the conductive path upon release of the compression of the matrix.

Figure 2:
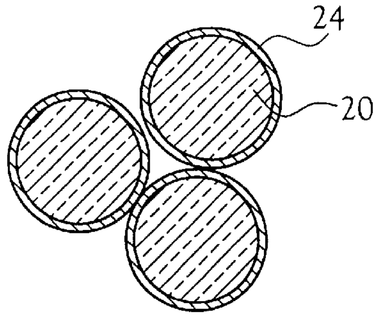
FIG. 2 is an enlarged sectional view of a plurality of three-dimensional metal-coated spheres for incorporation in the material such as that depicted in FIG. 1.
Figure 3:
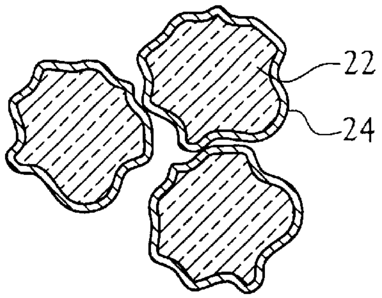
FIG. 3 is an enlarged sectional view of a plurality of three-dimensional metal-coated powder particles of irregular geometries for incorporation in the material such as that depicted in FIG. 1.

In the present invention, the principal conductive fillers may be of a variety of electrically conductive materials and/or combinations of materials. In one embodiment (FIGS. 2 and 3), suitable fillers include spheres 20 or powder particles 22 having an outer metal coating 24 as depicted in FIGS. 2 and 3. For present purposes, unless indicated to the contrary or otherwise obvious from the context of its use, the term "particle" is intended to refer to a particle having at least three dimensions, of generally equal values, as opposed to a flake or a rod which is substantially two-dimensional, for example. Particularly suitable fillers of the present invention include a substrate defined by spheres 20 or three-dimensional powder particles 22 of a material that is not electrically conductive, such as ceramic or glass spheres. Other suitable fillers include a substrate defined by powder particles that are substantially three-dimensional and coated with an electrically conductive metal. These powders may be non-electrically conductive themselves or be less electrically conductive than their metal coating. In one embodiment, the filler may comprise a substrate of a first metal powder that is coated with a second metal, the substrate metal preferably having a thermal conductivity which is less than the thermal conductivity of the second metal, as well as the coating being of greater electrical conductivity than the substrate metal. Mixtures of metal-coated spheres and metal-coated powder particles may also be employed. Further as noted hereinabove, the filler substrate may comprise hollow or porous spheres or powder particles or gas-filled spheres or powder particles. In the present invention, the particle size of the principal conductive fillers range from approximately 1 μm to approximately 150 μm in diameter, preferably between about 10 and about 90 μm in diameter.

In accordance with one aspect of the present invention, preferably, each metal-coated sphere or particle comprises a substrate that exhibits a thermal conductivity, which is materially less than the thermal conductivity of the metal of the coating. Preferably, the differential between the thermal conductivity of the substrate and the metal of the coating is between about 1.1 as in the instance of silver-plated copper particles, and 430, as in the instance of silver plated glass spheres, or even greater, such as in the instance of a graphite-based substrate which is coated with silver, nickel or other electrically conductive metal. To this end, the substrate sphere or particle may be of ceramic or glass or, alternatively, graphite, and the metal of the coating may be any metal or alloy which is electrically conductive and which exhibits a thermal conductivity which is greater than the thermal conductivity of the substrate. Suitable metals for use as a coating include silver, nickel, aluminum, and metals having like electrically conductive and thermal conductivity properties. Silver is particularly suitable in that it exhibits a relatively high thermal conductivity and good electrical conductivity. Table I presents the thermal conductivities and resistivities of examples of suitable materials for use in the metal-coated spheres or particles of the present invention:

TABLE I

| Thermal Conductivity at 27° C. in W/cm K; Resistivity at 27° C. in $10^{-8}$ Ωm | | |
|---|---|---|
| Material | Thermal Conductivity (W/cm K) | Resistivity ($10^{-8}$ Ωm) |
| Silver | 4.29 | 1.629 |
| Nickel | 0.907 | 7.20 |
| Aluminum | 2.37 | 2.733 |
| Copper | 4.01 | 1.725 |
| Graphite | 0.0018 | Very large compared to the metals |
| Glass | 0.01 | Insulator |

In a suitable typical embodiment, such as silver plated glass spheres, the mass of the silver metal coating contributes about 12% and the glass contributes about 88% of the overall mass of a typical metal-plated sphere of the filler. In this embodiment, the silver coating is about 1% of the overall thickness of the sphere. The present inventors have found that within this range of mass differential, any heat generated within the material is preferentially absorbed by the outer metal coating of the plated sphere or particle, as opposed to being absorbed by the substrate, so that such heat is readily dissipated to the matrix which immediately surrounds the plated sphere or particle to quickly and effectively cause such surrounding matrix to expand and break the contact between adjacent filler particles. This action of local heating of a limited quantity of the matrix adjacent each filler particle, has been found to halt the flow of current within the material before any significant buildup of heat occurs within the material. By this means, the material of the present invention does not suffer from the prior art problems relating to deterioration (instantaneously or over repeated actuation of current flow) of the material. Table II provides examples of prior art devices that exhibit deleterious effects thereupon as a consequence of the buildup of heat within the material during its use.

TABLE II

| Comparison Studies using solid fillers or Metal-coated fillers with large contact surface area: | | |
|---|---|---|
| Sample | Test Conditions | Results |
| S1 | $R_o$ = 50 Ω, $P_o$ = 5 kg/cm$^2$, $V_s$: 0–30 volts. | It gets hot when Vs ≧ 15 volts, and it starts to burn when Vs ≧ 24 volts. |
| S2 S4 S5 S6 | $R_o$ – 15 Ω, $P_o$ = 5 kg/cm$^2$, $V_s$: 0–30 volts. | The material shows signs of deterioration: it requires more pressure to conduct the same current after each use or under the same pressure the resistance of material increases after each use. |
| S3 | $R_o$ = 15 Ω, $P_o$ = 16 kg/cm$^2$, $V_s$: 0–30 volts. | There is a pinhole burn into the material at 16 volts. |

In one embodiment of the present invention, the non-conductive polymeric material is an elastomer having a positive coefficient of thermal expansion. By way of example, suitable polymeric materials include hydrocarbon rubbers such as natural rubber, synthetic polyisoprene, and polybutadiene; halogenated hydrocarbon rubber such as polychloroprene, and fluoroolefin rubber; polyurethane rubber, silicone rubber and many other synthetic or natural elastomeric materials. Those skilled in the art will recognize other polymer materials that can be substituted for the exemplary materials previously mentioned without departing from the scope and spirit of the present invention. In one embodiment, the cured filler-containing material exhibits a Shore A hardness of between about 20 and about 90.

The polymer materials suitable for use in the present invention may contain common ingredients such as additives, solvents, or the like for any of various reasons known in the polymer art. These common ingredients typically function as dielectric media in which conductive filler particles are insulatively and uniformly distributed. Silicone rubber is a particularly suitable matrix because it mixes well with the conductive fillers and generates a uniform and insulative distribution of conductive fillers in the elastomer matrix. Further, the silicone rubber exhibits excellent resiliency when compressed and decompressed through many cycles, has high temperature and arc resistance, a high positive coefficient of thermal expansion and can be used in adverse environmental conditions.

Various combinations of electrically conductive fillers embedded in various polymeric materials were formulated in accordance with the present invention and tested for various electrical properties of the product produced. Table III lists the formulation of these samples. Samples S1 through S6 represent formulations comprising various solid conductive fillers; namely carbon (S1), nickel powder (S2), (S3) and (S4), silver powder (S5) and silver-plated nickel flakes (S6) which are not considered acceptable for use in the material of the present invention. The silver-plated nickel flakes of Sample S6 readily stack so as to produce relatively large surface area contact between adjacent flakes. Therefore, these flakes, even though metal coated, when incorporated into a polymer matrix exhibit electrical properties substantially like the formulations of Samples S1 through S5 and is thus included as an example of an unacceptable "solid metal" filler like Samples S1 through S5. Samples S7 through S14, formulated as described in Table III, exhibit desirable electrical and thermal conductivity characteristics in accordance with the present invention.

TABLE III

Sample Formulations

| | Filler | Filler Particle Size (μm) | Polymer | Weight Ratio Range (nominal) (preferred) | Actual Weight Ratio Used |
|---|---|---|---|---|---|
| S1 | carbon pills | | silicone | | |
| S2 | nickel powder | 3 | addition cure silicone | 0.8–2.0<br>1.0–1.6 | 1.5 |
| S3 | nickel powder | 3 | thermoset polyurethane | 0.8–1.8 | 1.4 |
| S4 | nickel sphere | 40 | addition cure silicone | 4.0–6.0 | 5.0 |
| S5 | silver powder | 30 | addition cure silicone | 0.5–1.0<br>0.6–0.8 | 0.7 |
| S6 | silver-plated nickel flakes (SPNF) | 15 × 1 | addition cure silicone | 3.0–5.0 | 4.8 |
| S7 | silver-plated glass sphere (SPGS) (12% by weight silver) | 20 | addition cure silicone | 1.0–3.0<br>1.6–2.6 | 1.8 |
| S8 | silver-plated glass sphere (SPGS) (12% by weight silver) | 20 | condensation cure silicone | 1.0–2.0 | 1.5 |
| S9 | silver-plated glass sphere (SPGS) (12% by weight silver) | 20 | polyurethane | 2.0–4.0 | 2.5 |
| S10 | silver-plated glass sphere (SPGS) (12% by weight silver) | 20 | addition cure silicone | 1.75 | 1.75 |
| | aluminum powder | 75 | | 0.37 | 0.37 |
| S11 | nickel-plated graphite powder (NPGP) (60% by weight nickel) | 90 | addition cure silicone | 0.5–2.0<br>0.8–1.5 | 1.0 |
| S12 | silver-plated nickel powder (SPNP) (15% by weight silver) | 30 | addition cure silicone | 2.0–4.0<br>2.5–3.0 | 2.6 |
| S13 | silver-plated copper powder (SPCP) (15% by weight silver) | 45 | addition cure silicone | 2.0–4.0<br>2.5–3.0 | 2.8 |
| S14 | silver-plated aluminum powder (SPAP) (20% by weight silver) | 45 | addition cure silicone | 1.5–3.0<br>1.8–2.5 | 1.9 |

Test conditions and typical data obtained by using metal-coated spheres or powder particles as formulated as Samples S7 through S14 are listed in Table IV. Terms of switching current and continuous current are defined in Table IV.

TABLE IV

Test conditions and typical data with metal-coated spheres or powder particles

| Characteristics | Sym. | Data | Conditions |
|---|---|---|---|
| Operating Voltage Range | $V_o$ | 0–30 V | DC/AC |
| Resistance Without Pressure | $R_{max}$ | >30M Ω | 25° C. |
| Min. Resistance Under Pressure | $R_{min}$ | ≦0.1 Ω | 25° C. |
| Max. Switching Current$^{\zeta}$ @ 6 VDC/AC | $I_{s\ max}$ | 1.5 A/cm$^2$ | $R_o$ = 4 Ω Linear load Material thickness: ≦ 2.5 mm |
| Max. Continuous Current$^{*}$ @ 6 VDC/AC | $I_{c\ max}$ | 5 A/cm$^2$ | $R_o$ = 1 Ω Linear load Material thickness: ≦ 2.5 mm |
| Max. Switching Current$^{\zeta}$ @ 12 VDC/AC | $I_{s\ max}$ | 0.7 A/cm$^2$ | $R_o$ = 17 Ω Linear load Material thickness: ≦ 2.5 mm |
| Max. Continuous Current$^{*}$@ 12 VDC/AC | $I_{c\ max}$ | 4 A/cm$^2$ | $R_o$ = 3 Ω Linear load Material thickness: ≦ 2.5 mm |
| Max. Switching Current$^{\zeta}$ @ 24 VDC/AC | $I_{s\ max}$ | 0.3 A/cm$^2$ | $R_o$ = 80 Ω Linear load Material thickness: ≦ 2.5 mm |
| Max. Continuous Current$^{*}$@ 24 VDC | $I_{c\ max}$ | 3 A/cm$^2$ | $R_o$ = 8 Ω Linear load Material thickness: ≦ 2.5 mm |

Footnotes $^{\zeta}$Switching current is measured under the following test conditions:
At $t_o = 0°$ (s): $P_o = 0$, $V_o = V_s$, $I_o = 0$
At $t = t_o + dt$ (s): $P_t = P_a^{‡}$(kg/cm$^2$), $V_t = V_s$,
$I_t$ = current switched (A)
$^{*}$Continuous current is measured under the following test conditions:
At $t_o = 0°$ (s): $P_o = P_a^{‡}$(kg/cm$^2$), $V_o = 0$, $I_o = 0$ (A)
At $t = t_o + dt^{†}$ (s): $P_t = P_a^{‡}$ (kg/cm$^2$), $V_t = V_s$,
$I_t$ = continuous current (A)
$^{‡}P_o$ stands for actuation pressure.

Figure 10:
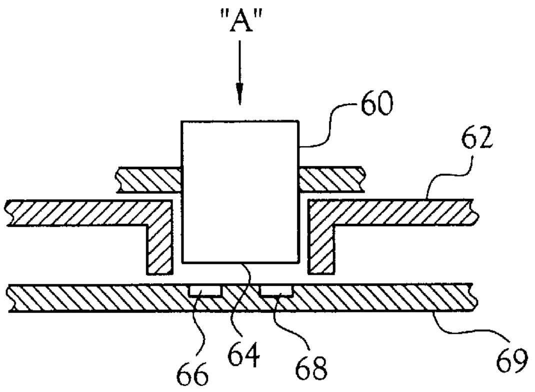
Fig.10 (PRIOR ART)
FIG. 10 is a schematic representation of a portion of a prior art keypad employing a carbon-filled material in a switching function.
Figure 4:
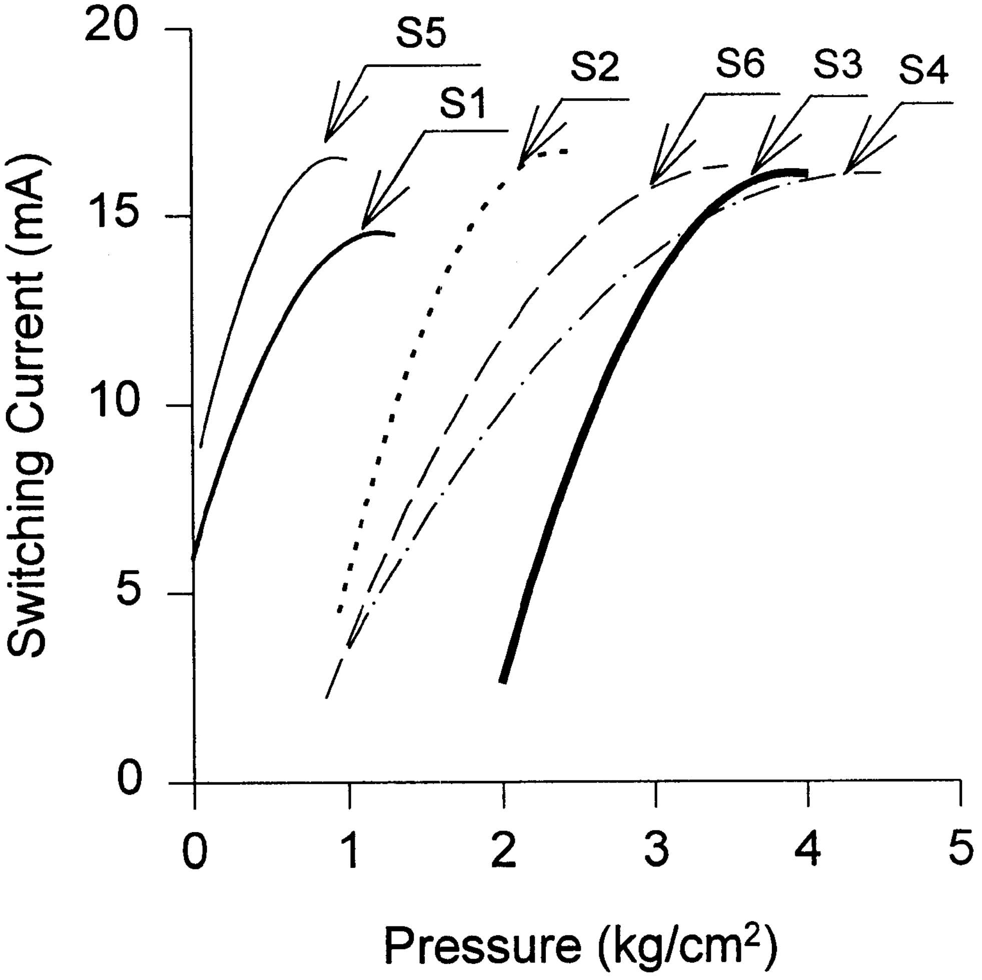
FIG. 4 is a graph depicting the switching current of a carbon-filled silicone, a solid metal filler and other prior art electrically conductive materials.
Figure 5:
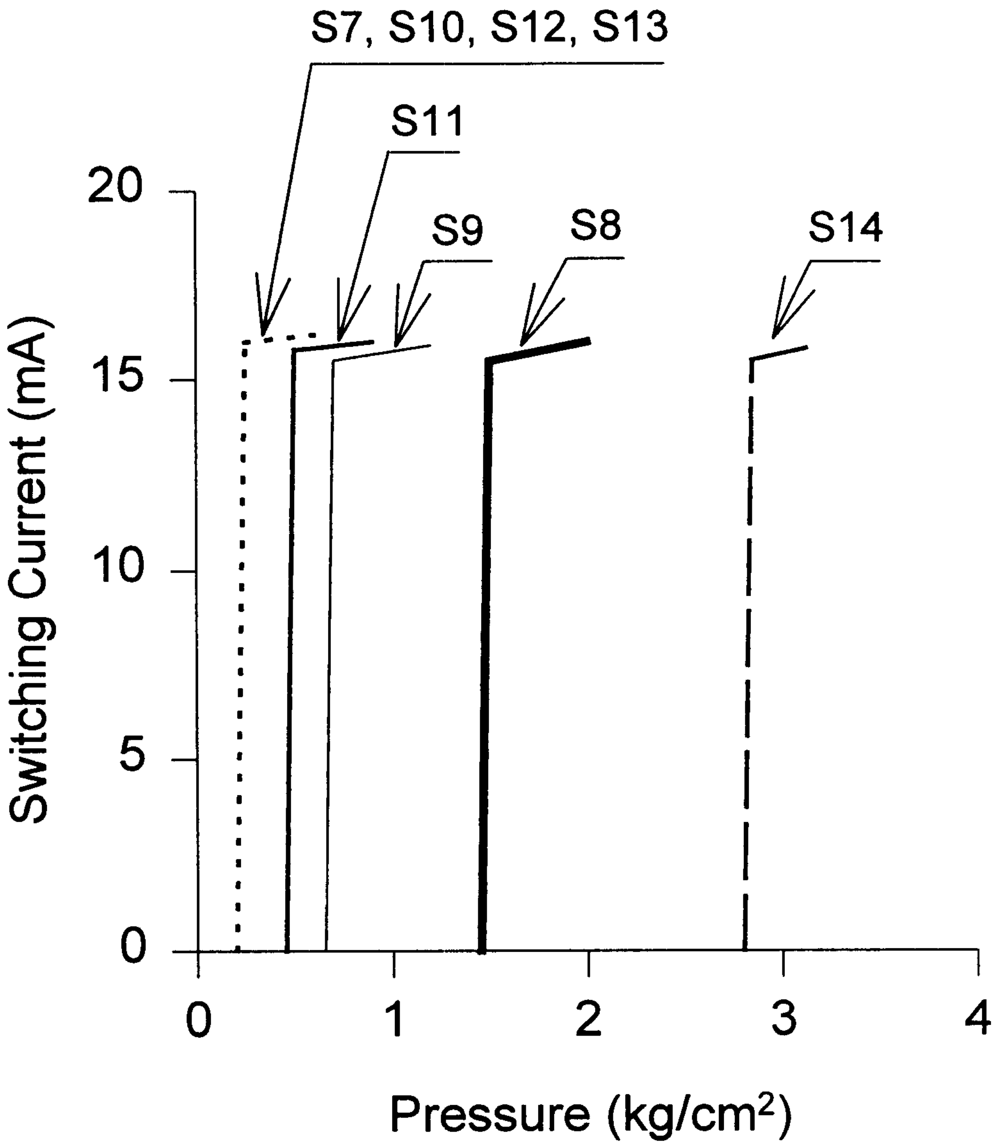
FIG. 5 is a graph depicting an on-off switching characteristic under light pressure with metal-plated spheres or particles as fillers as employed in the present invention.

Carbon particles embedded in a matrix is one example of an electrically conductive material exhibiting variable current change with pressure. This product is at least "surface" electrically conductive at all times. This combination of materials is commonly used in keypads such as that depicted schematically in FIG. 10. In the depicted example, an electrically conductive carbon pill 60 is mounted for reciprocal movement (see arrow "A") within a housing 62 with one end 64 of the pill being biased out of engagement with first and second electrical contacts 66, 68, respectively, associated with a circuit board 69, for example. Upon the application of pressure to the pill forcing it to engage both the first and second contacts and establish an electrically conductive path between the first and second contacts. Breaking of this engagement breaks off the electrically conductive path, ie., a switching function is performed. Referring to FIG. 4, the switching current of a carbon-filled silicone as commonly used in such commercially available keypads (S1) is depicted. It is to be noted that this material exhibits a gradual resistance change with increasing pressure. Other solid fillers such as nickel powder (S2 and S3), nickel spheres (S4), silver powder (S5) or silver-plated nickel flakes (S6) embedded in silicone or urethane, exhibit similar behavior. Contrary to the variable current change in samples depicted in FIG. 4, FIG. 5 depicts an on-off switching characteristic under light pressure with metal-plated spheres or particles as fillers as employed in the present invention. This characteristic translates into a very drastic resistance change that is particularly useful in on-off switching of electrical devices.

Figure 11:
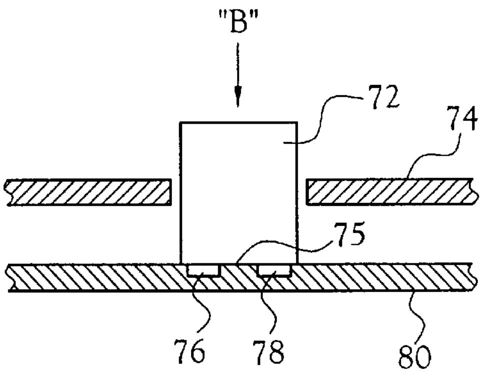
FIG. 11 is a schematic representation of a portion of a switching device employing the material of the present invention.

In the device depicted in FIG. 11, the material of the present invention is electrically non-conductive when the matrix thereof is in its relaxed state. FIG. 11 depicts schematically, one embodiment of a switching device employing the material of the present invention. In the depicted device of FIG. 11, a button 72 of the material of the present invention is mounted within a housing 74. The button 72 includes one end 75 thereof which is at all times in engagement with first and second contacts 76, 78, respectively, associated with a circuit board 80, for example. Application of pressure against the button 72 as indicated by the arrow "B" in FIG. 11, compresses the button and establishes at least one electrically conductive path between within the end of the button, thereby establishing an electrically conductive path between the first and second contacts 76, 78. Release of the compression applied to the button permits the elastic matrix of the button to expand, destroying the electrically conductive path(s) within the button and destroying the electrically conductive path between the first and second contacts 76, 78, i.e., performing a switching function.

The on-off switching characteristic of the material of the present invention is believed to be the result of small contact areas between conductive particles and differences in resistivity and thermal conductivity between the metal coating and the substrate. In the case of metal-coated spheres or powder particles (S7 through S14 of Table III), the metal coating has lower resistivity than the substrate (See Table I for typical resistivities) therefore more current flows through the metal coating. In addition, the metal coating is more thermally conductive than the substrate (See Table I for typical thermal conductivities), and therefore, more heat is focused on the metal coating and quickly expands the immediately surrounding elastic polymer material slightly. As noted, by reason of the very small area of contact between adjacent spheres or particles of the filler of the present material, very little local expansion of the matrix is required to effect separation, and loss of electrical conductivity between, adjacent ones of the individual spheres or particles of the filler material, thereby providing almost immediate cessation of the buildup of heat within the material and the resultant lack of significant change in the overall temperature of the material.

Figure 6:
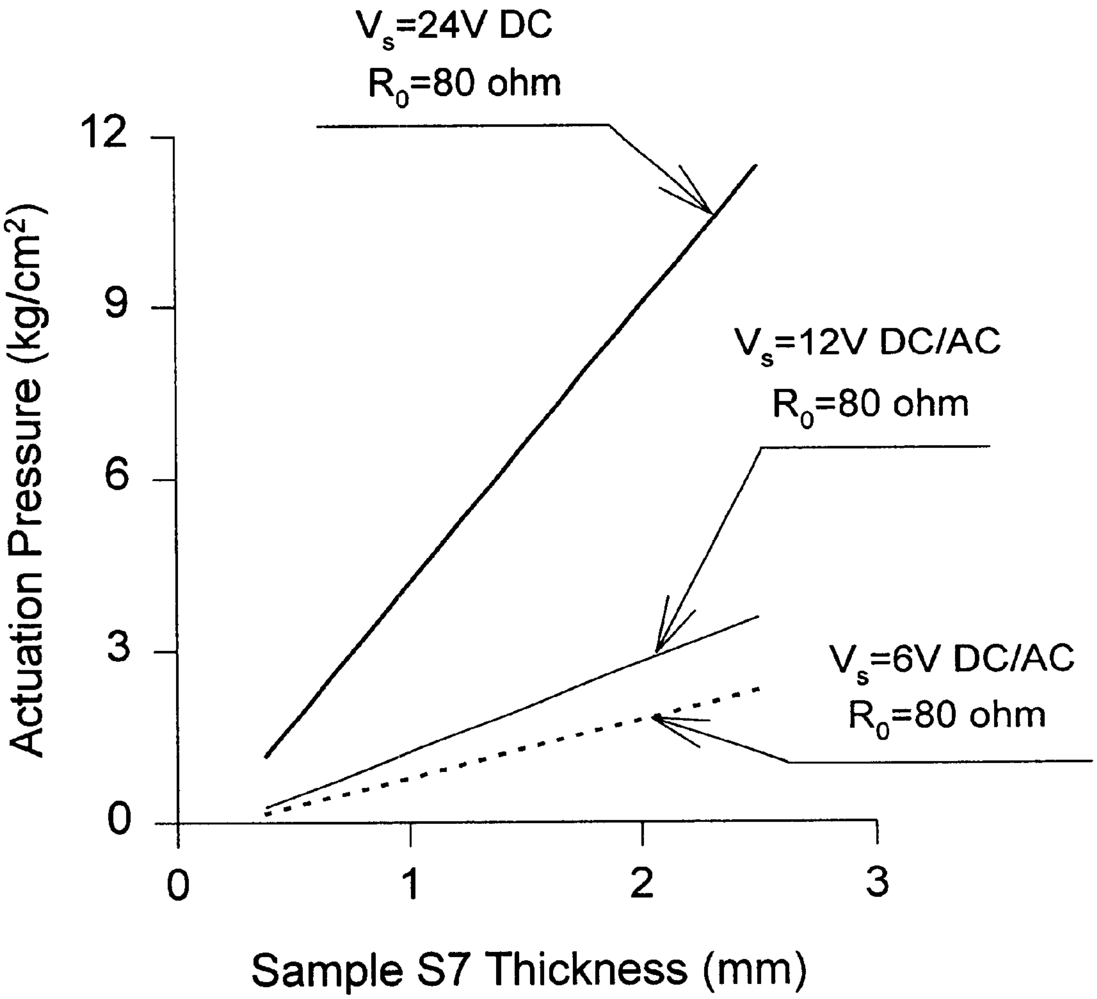
FIG. 6 is a graph depicting the actuation pressure of a typical material of the present invention at 6, 12, and 24 volts.
Figure 7:
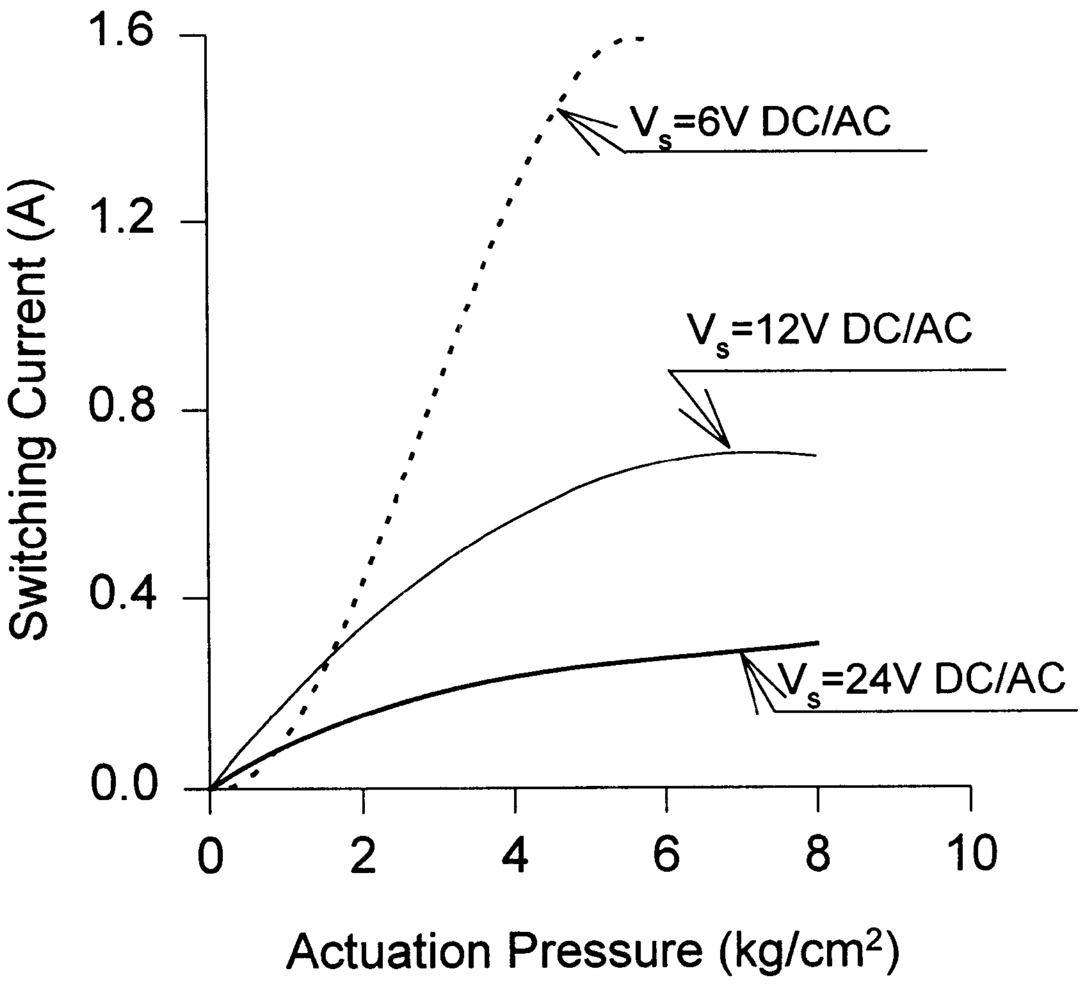
FIG. 7 is a graph depicting the relationship of a material of the present invention to its switching current at different voltages and actuation pressures.
Figure 8:
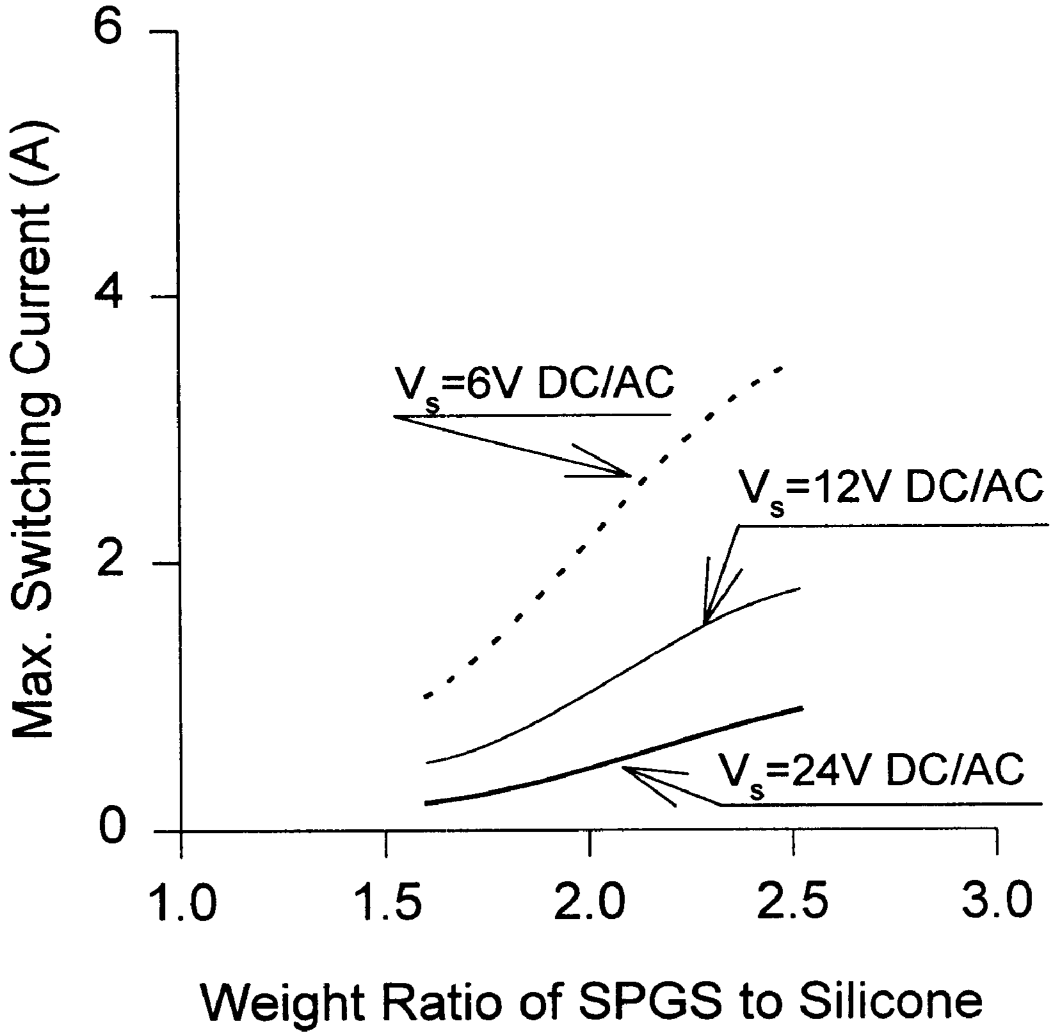
FIG. 8 is a graph depicting the maximum switching current exhibited by a typical material of the present invention at different voltages.

With the metal-coated spherical and powder particles of the present invention, the contact areas between particles are small, so that electrical connections are easily broken by very little expansion of the matrix. The change in the overall temperature of the material is, therefore, essentially unnoticeable. The operative conditions of the present invention, therefore, occur when the external pressure applied to the polymeric matrix having metal-plated electrically conductive particles embedded therein compresses the material sufficiently to bring enough of the filler particles together to establish an electrical flow path of very low resistance, and wherein the area of contact between adjacent ones of the filler particles is on the order of point-to-point contact, so that within an operating range of zero to about 30 volts, the metal coating can dissipate heat effectively at a local level, without causing resistance change, up to a preselected level of switching current, while retaining the ability at a preselected level of continuous current flow to effect that degree of expansion of the polymeric matrix which produces a latching effect. This critical pressure is called actuation pressure ($P_a$) under which the material becomes conductive. FIG. 6 depicts the actuation pressure of a typical material of the present invention at 6, 12 and 24 volts.

In the case of solid carbon, nickel, silver or any other solid particles, which are typical of the prior art, current flows and heat dissipates uniformly throughout filler particles and therefore, sufficient expansion of the matrix to break electrical connections between contiguous filler particles occurs only after the filler particles themselves have heated or cooled, as the case may be. In these prior art materials, as pressure applied to the material increases, more and more particles are placed in contact with each other, which in turn lowers the resistance resulting in the variable current-pressure behavior of these materials as depicted in FIG. 4.

Leaf-shaped fillers such as silver-plated nickel flakes, such as described in Sample S6 of Table III, having dimensions of about 15 microns across and about one micron in thickness, stack with each other very well which results in a large contact surface area. A much larger expansion of the polymeric matrix is required to break the large contact areas between flakes, and therefore, it exhibits the variable current-pressure behavior as depicted for S6 in FIG. 4.

The relationship between actuation pressure, material thickness, operating voltage, conductive particle loading, and switching current of typical materials of the present invention are illustrated in FIGS. 5–8. In these Figures, the data are based on silver-plated glass spheres (SPGS) filled silicone samples. Other materials follow similar trends, but the actual curves vary from material to material.

Figure 9:
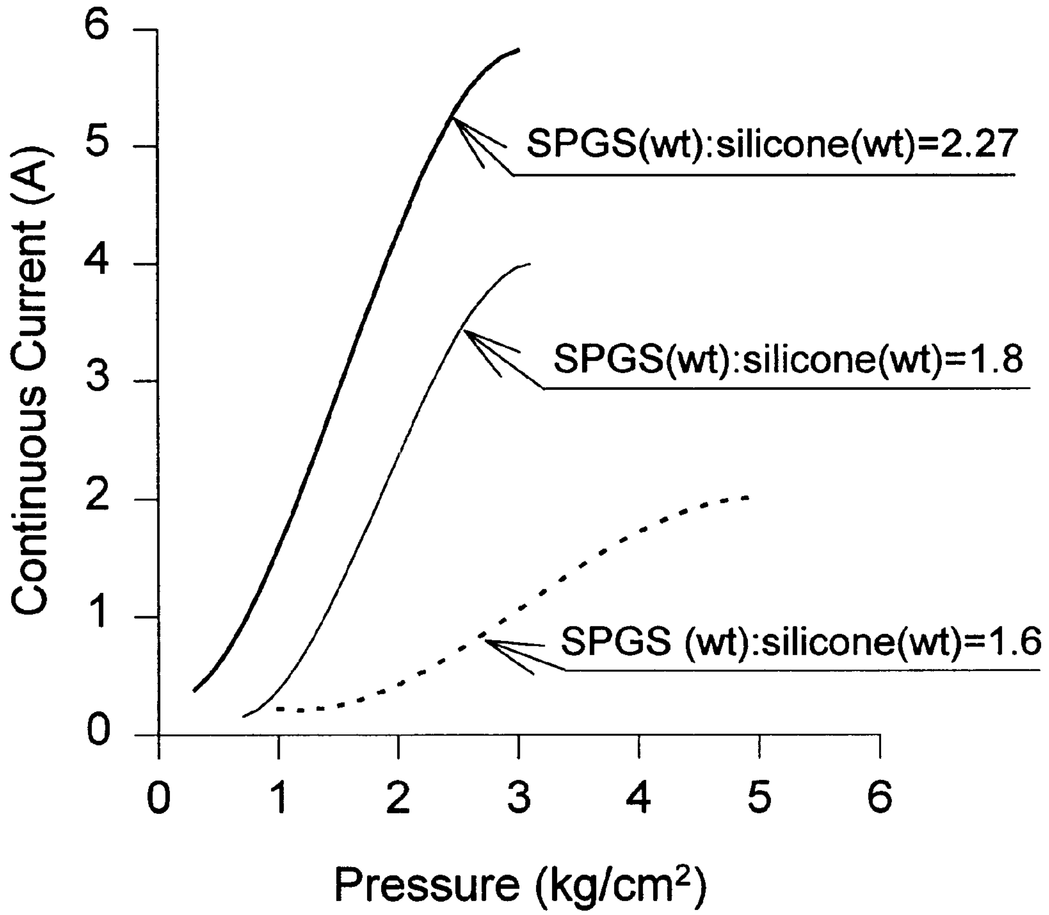
FIG. 9 is a graph depicting the maximum continuous current at various pressures applied to a sample of the material of the present invention.

FIG. 9 is based on data from SPGS filled silicone samples formulated in accordance with the present invention and shows that maximum continuous current is pressure and conductive particle loading dependent. Other materials follow similar trends, but the actual curves vary from material to material.

The present inventors have found that under conditions of continuous current flow, the materials of the present invention exhibit a latching function. Continuous current is defined in Table IV. Specifically, it has been found that in a polymeric matrix having embedded therein metal-coated spheres or powder particles as conductive fillers, current drops to zero or few miliamperes as soon as the current exceeds the maximum continuous current value for the material in question, and there is insignificant change in the overall temperature of the material. These results are repeatable indicating that there is no arcing or substantial damage to the material. Small contact areas between conductive particles and differences in resistivity and thermal conductivity between metal coating and substrate of the filler particles are believed to be the source of this feature of the materials of the present invention, in that, beyond maximum continuous current, there is sufficient expansion to quickly break the connections between the conductive particles of these materials. Comparison studies are presented in Table II.

Advantage of the latching function may be taken by using this function as a pressure sensitive current limiting device, which can replace certain semiconductor-based electronic circuits, for example. Latching function is also observed when switching a current greater than the maximum switching current. For example, where $V_s$ is 12 volts and sample S7 is used to switch on a 1A current, this can only be done in this order: sufficient pressure, in this case 1.5 kg/cm$^2$, must be applied to the material first before 12 volt power can be connected. If 12 volts is connected first, the circuit will be open regardless of the pressure. Because relatively high current can be involved in the operation, this feature can serve as a safety precaution. For example, This latching function can be used in a safety mat or seat where the operator must be present on the mat or seat and apply sufficient pressure to a material of the present invention, before connecting power to the equipment or instrument. Also, the present material can be installed in equipment where certain lids, covers, or doors must be closed before power can be connected to the system.

Preparation of the Samples S2 through S14 of Table III was carried out as follows:

In each Example, filler and polymer were weighed out according to proper ratios and then mixed by mechanical mixer. The mixture was poured or placed in a mold and cured following conventional curing procedures recommended by the manufacturer of the polymer.

Detailed preparations for the samples described are described as follows:

Sample S2: 1.5 g nickel powder with an average particle size of 3 microns was mixed with 1 g of two-part room temperature vulcanizable platinum-catalyzed silicone rubber. The mixture was then poured into a mold cavity having 1 cm×1 cm square pockets with various depths. The material was allowed to cure for at least 24 hours.

Sample S3: 1.4 g nickel powder with an average particle size of 3 microns was mixed with 1 g of two-part room temperature vulcanizable (RTV) polyurethane rubber. The mixture was then poured into a mold cavity having 1 cm×1 cm square pockets with various depths. The material was allowed to cure for at least 24 hours.

Sample S4: 5 g nickel spheres with an average particle size of 40 microns was mixed with 1 g of two-part RTV platinum-catalyzed silicone rubber. The mixture was then poured into a mold cavity having 1 cm×1 cm square pockets with various depths. The material was allowed to cure for at least 24 hours.

Sample S5: 0.7 g silver powder with an average particle size of 30 microns was mixed with 1 g of two-part RTV platinum-catalyzed silicone rubber. The mixture was then poured into a mold cavity having 1 cm×1 cm square pockets with various depths. The material was allowed to cure for at least 24 hours.

Sample S6: 4.8 g silver-plated nickel flakes about 15 microns across and about 1 micron thickness was mixed with 1 g of two-part RTV platinum-catalyzed silicone rubber. The mixture was then poured into a mold cavity having 1 cm×1 cm square pockets with various depths. The material was allowed to cure for at least 24 hours.

Sample S7: 1.8 g silver-plated glass spheres with an average particle size of 20 microns was mixed with 1 g of two-part RTV platinum-catalyzed silicone rubber. The mixture was then poured into a mold cavity having 1 cm×1 cm square pockets with various depths. The material was allowed to cure for at least 24 hours.

Sample S8: 1.5 g silver-plated glass spheres with an average particle size of 20 microns were mixed with 1 g of one-part moisture-cure RTV silicone rubber. 0.33 g mineral spirits was added to the mixture to facilitate uniform distribution of the fillers. Other solvents such as ether, toluene, or xylene, or like solvents, may also be used to facilitate mixing. The mixture was then poured into a mold cavity having 1 cm×1 cm square pockets with various depths. The material was allowed to cure for at least 24 hours.

Sample S9: 2.5 g Silver-plated glass spheres with an average particle size of 20 microns was mixed with 1 g two-part RTV polyurethane rubber. The mixture was then poured into a mold cavity having 1 cm×1 cm square pockets with various depths. The material was allowed to cure for at least 24 hours.

Sample S10: 1.75 g Silver-plated glass spheres with an average particle size of 20 micron and 0.37 g aluminum powder with an average particle size of 75 micron were mixed with 1 g two-part platinum-catalyzed RTV silicone rubber. The mixture was then poured into a mold cavity having 1 cm×1 cm square pockets with various depths. The material was allowed to cure for at least 24 hours.

Sample S11: 1 g of Nickel-plated graphite powder with an average particle size of 90 microns was mixed with 1 g two-part platinum-catalyzed RTV silicone rubber. The mixture was then poured into a mold cavity having 1 cm×1 cm square pockets with various depths. The material was allowed to cure for at least 24 hours.

Sample S12: 2.6 g Silver-plated Nickel spheres with an average particle size of 30 microns were mixed with 1 g two-part platinum-catalyzed RTV silicone rubber. The mixture was then poured into a mold cavity having 1 cm×1 cm square pockets with various depths. The material was allowed to cure for at least 24 hours.

Sample S13: 2.8 g Silver-plated Copper powder with an average particle size of 45 microns was mixed with 1 g two-part platinum-catalyzed RTV silicone rubber. The mixture was then poured into a mold cavity having 1 cm×1 cm square pockets with various depths. The material was allowed to cure for at least 24 hours.

Sample S14: 1.9 g Silver-plated Copper powder with an average particle size of 45 microns was mixed with 1 g two-part platinum-catalyzed RTV silicone rubber. The mixture was then poured into a mold cavity having 1 cm×1 cm square pockets with various depths. The material was allowed to cure for at least 24 hours.

The samples prepared as set forth above were tested for electrical properties. The common setup for the various electrical tests performed upon the samples included a 1 cm×1 cm sample material of a given thickness placed between two 1 cm×1 cm metal plates. The metal plates and the sample are then placed in a force gauge. The metal plates are wired to a linear resistive load and power source.

A typical test for measuring switching current under various pressures using 1 mm thick Sample S2 was conducted as follows: The metal plates were wired in series to a 350Ω resistor and a 6 VDC power source. Step 1 involved applying 6 VDC to the sample with no pressure being applied to the material. In step 2, a predetermined pressure was applied to the sample and the current measured. Step 3 involved releasing the pressure from the sample. Steps 1–3 were repeated at various pressures to obtain data relating the switching current at an applied pressure for the sample.

A typical test for actuation pressure at 6 VDC using 1 mm thick Sample S7 was conducted as follows: The metal plates were wired in series to a 350Ω resistor and a 6 VDC power source. Step 1 involved applying 6 VDC to the sample with no pressure being applied to the material. In step 2, a predetermined pressure was applied to the material and the current measured. If no current was measured, step 3 was to release the pressure from the sample. Steps 1–3 were repeated until a current was measured and the applied pressure was recorded as the actuation pressure.

A typical test for measuring maximum switching current under certain pressure at 6 VDC using 1 mm thick Sample S7 was conducted as follows: the metal plates were wired in series to a variable resistor and a 6 VDC power source. Step 1 involved applying 6 VDC to the sample with no pressure being applied to the material and the variable resistor set at a predetermined resistance (e.g., 50Ω). In step 2, a predetermined pressure that is equal or greater than the actuation pressure was applied to the material and the current measured. Step 3, the applied predetermined pressure on the material is released and the resistance of variable resistor was lowered. Next, the same predetermined pressured was applied and the current measured at the new lower resistance. The maximum switching current was reached right before the material reached its latch: no current (or only a very small leakage current) can be switched on.

A typical test for measuring maximum continuous current under certain pressure at 6 VDC using 1 mm thick Sample S7 was conducted as follows: the metal plates were wired in series to a variable resistor and a 6 VDC power source. Step 1 involved applying sufficient pressure to the sample with no voltage being applied to the material and the variable resistor set at a predetermined resistance (e.g., 50Ω). In step 2, the 6 VDC output was applied and the current measured. Step 3, the resistance of the variable resistor was gradually decreased and the current measured. The maximum current was recorded right before the material reached its latch-off state in which none or few milliamperes could be measured.

The material of the present invention is useful, among other things, as: (a) pressure sensitive switches or smart conductors where certain minimum pressure must be applied to a certain thickness material under certain operating voltage and load before the equipment, devices or machinery can be switched on or certain motion and/or certain functions are allowed, (b) pressure-sensitive switches can be used in security or surveillance systems wherein the security system can provide very focused detections for a specific area, (c) pressure-sensitive conductive rubber can replace carbon pills in conductive rubber keypads—compared to typical carbon pills (0.15" diameter, 0.015" thick), the present material has similar actuation force (<200 g) but has lower contact resistance (200Ω typical for carbon pills), and does not create potential shorts due to carbon residue accumulation on PCB traces or any conductive material and the unique pressure activated conductivity simplifies product design since the present material can literally rest on the conductive media without creating electrical shorts and it is conductive only in the area of pressure, (d) pressure-sensitive conductive rubber for membrane switch construction—the present material can replace the shorting pad and eliminate the spacer between shorting pad and PCB, (e) pressure-sensitive conductive rubber used as gaskets for RFI/EMI shields, and/or (f) as anti-static materials. Further uses of the present material which take advantage of its latching function are noted hereinabove.

Because of the formulation of the present material, it can be readily formed by conventional molding techniques into shapes which exhibit desirable aesthetic appearances, and/or "user friendly" shapes, while retaining its desirable electrical properties. The material is relatively inexpensive and can be fabricated with different degrees of "feel".

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. In a material which is activated from an electrical non-conductive state to an electrically conductive state by the compression of the material through the application of an externally applied pressure, the improvement wherein the material comprises a filler including substrate spheres or particles which are coated with an outer layer of metal, said filler being substantially uniformly distributed in spaced apart relationship to one another within a elastomeric polymeric matrix, said substrate spheres or particles each having a thermal conductivity less than the thermal conductivity of said metal coating thereon, said spheres or particles of said filler being disposed in essentially non-electrically conductive relationship to one another when said polymeric matrix is in its relaxed state and at least a plurality of said spheres or particles of said filler being in electrically conductive relationship when a preselected pressure is applied to compress said polymeric matrix.

2. The material of claim 1 wherein said substrate spheres or particles each exhibit an electrical conductivity less than the electrical conductivity of said metal coating thereon.

3. The material of claim 1 wherein the degree of compression of the material required to activate the material from an electrically non-conductive state to an electrically conductive state is sufficient to cause a plurality of adjacent ones of said filler substrate spheres or particles to make at least point-to-point contact thereby establishing at least one electrically conductive path within the material.

4. The material of claim 1, whereby changes in the electrical resistance of said material produces minimal change in the overall temperature of said material.

5. The material of claim 1 wherein the differential in thermal conductivity between said metal coating of each sphere and the sphere substrate is between about 1.1 and 430, or greater.

6. The material of claim 1 where said metal-coated spheres or particles are of an average particle size less than 150 $\mu$m.

7. The material of claim 1 wherein said filler is present within said polymeric matrix at a ratio of between about 0.5 and about 4 parts by weight of filler to 1 part, by weight, of polymeric matrix.

8. The material of claim 1 wherein said filled polymeric matrix exhibits a Shore A hardness of between about 20 and about 90.

9. The material of claim 1 wherein said filled polymeric matrix exhibits an operating range between 0 and 30 volts, an electrical resistance without pressure applied thereto of >30 megohms, and a minimum electrical resistance under pressure not exceeding about 0.1 ohm.

10. The material of claim 1 wherein said filled polymeric matrix exhibits a maximum switching current at 6 volts of about 1.5 amp/cm$^2$, a maximum switching current at 12 volts of about 0.7 amp/cm$^2$, and a maximum switching current at 24 volts of about 0.3 amp/cm$_2$.

11. The material of claim 1 wherein said filled polymeric matrix exhibits a maximum continuous current at 6 volts of about 5 amp/$cm^2$, a maximum continuous current at 12 volts of about 4 amp/$cm^2$, a maximum continuous current at 24 volts of about 3 amp/$cm^2$.

12. The material of claim 1 wherein said polymeric matrix is cured.

13. The material of claim 1 wherein said spheres or particles of said filler exhibit substantially three-dimensional geometry.

14. A method for the manufacture of a pressure sensitive switch comprising the steps of:

(a) selecting a plurality of filler particles, said filler particles including a plurality of substrate spheres or particles, each of which is provided with a metal coating, each of said filler particles including a substrate having a thermal conductivity less than the thermal conductivity of its metal coating;

(b) selecting an uncured elastomeric polymeric matrix;

(c) uniformly disbursing said filler particles within said uncured matrix with insufficient ones of said filler particles being in contact with one another to develop an electrically conductive path within said matrix; and (d) curing said matrix containing said filler particles to fix the relative locations of individual ones of said filler particles in spaced apart relationship.

15. The method of claim 14 wherein each of said filler particles comprises an essentially non-electrically conductive material.

16. The method of claim 14 wherein each of said filler particles comprises a sphere or three-dimensional particle.

17. The method of claim 14 wherein each of said filler particles comprises a glass sphere and a metal coating selected from either silver, nickel, aluminum, or copper.

18. An electrical switch comprising at least first and second electrical contacts connected in a circuit and an elastomeric normally electrically non-conductive material when in its relaxed state, disposed in engagement with said first and second contacts, said material being electrically conductive when compressed, said material comprising an elastomeric polymeric matrix and a plurality of individual spheres or particles including a substrate and an outer electrically conductive coating thereon, said substrate having a thermal conductivity less than the thermal conductivity of said conductive coating thereon.

19. The switch of claim 18 wherein said plurality of individual spheres or particles are disbursed substantially uniformly in spaced apart relationship to one another within said matrix when said matrix is in its relaxed state.

20. The switch of claim 19 wherein, upon placement of said matrix in compression, the spacing between said individual spheres or particles is reduced to the extent that multiple ones of said spheres or particles are brought into physical contact with one another to establish at least one electrically conductive path within said material.

21. In a material which is activated from an electrically non-conductive state to an electrically conductive state by the compression of the material through the application of an externally applied pressure, the improvement wherein the material comprises a filler including a plurality of particulates, said filler particulates being substantially uniformly distributed in spaced apart relationship to one another within an elastomeric polymeric matrix, each of said filler particulates comprising a body having its outer periphery defined by an electrically conductive material and its interior defined by a material having a thermal conductivity less than the thermal conductivity of said periphery of said body, said filler particulates being disposed in essentially non-electrically conductive relationship to one another when said polymeric matrix is in its relaxed state and at least a plurality of said filler particulates being in electrically conductive relationship when a preselected pressure is applied to compress said polymeric matrix.

22. The material of claim 21 wherein said filler particulates comprise a peripheral layer of a metal and an interior of either a relatively inert gas, glass, ceramic, or a metal having an electrical conductivity less than the electrical conductivity of said peripheral layer of metal.

23. The material of claim 21 wherein said interior of individual ones of said plurality of particulates comprises a vacuum.

24. In a material which is activated from an electrically non-conductive state to an electrically conductive state by the compression of the material through the application of an externally applied pressure, the improvement wherein the material comprises a filler including a plurality of particulates, said filler particulates being substantially uniformly distributed in spaced apart relationship to one another within an elastomeric polymeric matrix, each of said filler particulates comprising a body having its outer periphery defined by an electrically conductive material and its interior defined by a material having a thermal conductivity less than the thermal conductivity of said periphery of said body, said filler particulates being disposed in an essentially electrically non-conductive relationship to one another when said polymeric matrix is in its relaxed state and at least a plurality of said filler particulates being in an electrically conductive relationship when a preselected pressure is applied to compress said polymeric matrix.

25. The improvement of claim 24 wherein an applied current exceeds a maximum continuous current, sufficient expansion occurs to dispose said filler particulates in an essentially electrically non-conductive relation to one another.

26. In a material which is activated from an electrically non-conductive state to an electrically conductive state by the compression of the material through the application of an externally applied pressure, the improvement wherein the material comprises a filler including a plurality of particulates, said filler particulates being substantially uniformly distributed in spaced apart relationship to one another within an elastomeric polymeric matrix, each of said filler particulates comprising a body having its outer periphery defined by an electrically conductive material and its interior defined by a material having a thermal conductivity less than the thermal conductivity of said periphery of said body, wherein a switched current exceeds a maximum switching current said filler particulates remaining disposed in an essentially electrically non-conductive relationship to one another when said polymeric matrix is in its relaxed state unless a preselected pressure is applied to compress said polymeric matrix prior to applying a voltage to the material.

27. An electrical latch comprising at least first and second electrical contacts connected in a circuit and an elastomeric normally electrically non-conductive material when in its relaxed state, disposed in engagement with said first and second contacts, said material being electrically non-conductive unless a preselected pressure is applied to compress said material prior to applying a voltage to said material.

* * * * *